Oct. 4, 1932.                P. C. DUTTON ET AL                1,880,376
                                MANDREL JOINT
                              Filed Nov. 22, 1929
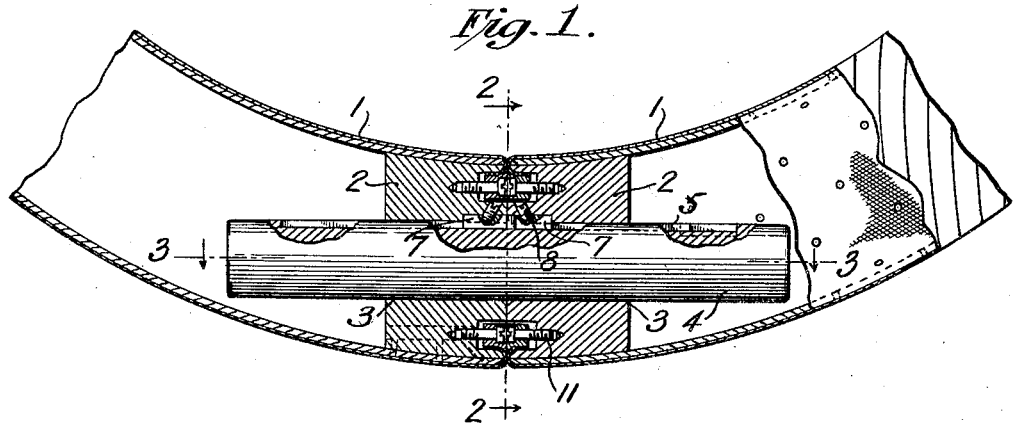
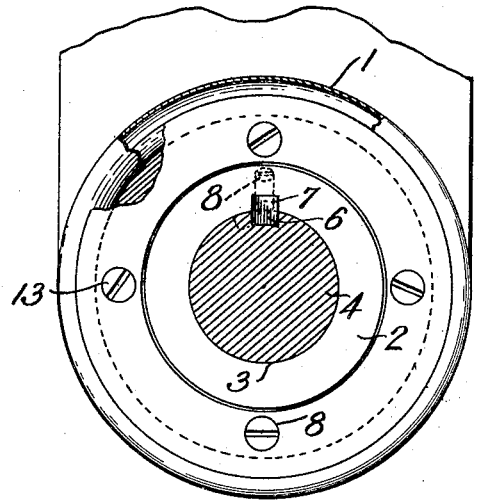
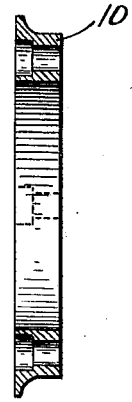
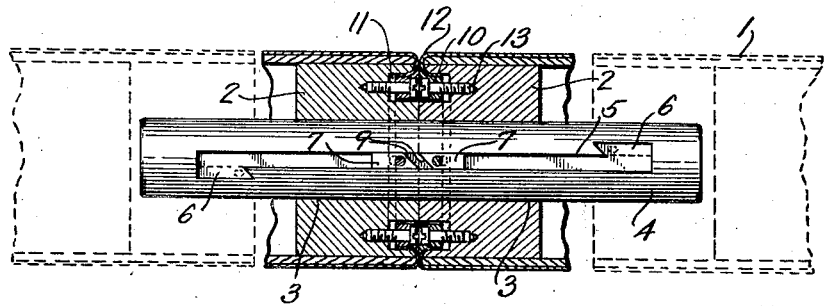
INVENTORS
Eardley Hazell
Percy C. Dutton
BY
ATTORNEY Patented Oct. 4, 1932

1,880,376

UNITED STATES PATENT OFFICE

PERCY C. DUTTON, OF NUTLEY, NEW JERSEY, AND EARDLEY HAZELL, OF NEW YORK, N. Y., ASSIGNORS TO MORGAN & WRIGHT, OF DETROIT, MICHIGAN, A CORPORATION OF MICHIGAN

MANDREL JOINT

Application filed November 22, 1929. Serial No. 409,091.

This invention relates to an apparatus to be used in the manufacture of continuous rubber tubes.

In the manufacture of rubber tubes such as inner tubes, it is common to form a tube having free ends and to unite the ends to form a joint and thereby to form a continuous tube. Such a joint is undesirable and costly to make.

Rubber tubes such as inner tubes may be formed by the deposition of the solid constituents of a rubber dispersion upon a base member or mandrel. By making a mandrel in continuous circular form, a rubber tube may be formed by the deposition of the solid constituents of a rubber dispersion upon the mandrel, which tube will be continuous and jointless. Mandrels of the continuous type for the manufacture of continuous jointless tubes must be made in at least two sections in order that the sections may be separated and withdrawn from the tube through an aperture in the tube.

It is the object of this invention to provide a joint for mandrels of the continuous type upon which continuous rubber tubes may be formed. It is also an object of this invention to provide a joint for mandrels which permits the separation and rotation of the sections of a mandrel without disconnecting them. Another object of this invention is to provide a joint for mandrels which will properly align the sections of the mandrel when in juxtaposed position.

Other objects and advantages of the present invention will appear in the following detailed description taken in connection with the accompanying drawing in which:

Fig. 1 is a cross sectional view of the preferred embodiment of our invention;

Fig. 2 is a cross section on line 2—2 of Fig. 1;

Fig. 3 is a cross section on line 3—3 of Fig. 1;

Fig. 4 is a detail view.

The mandrel construction to which this invention is applicable may be of any of various types such as disclosed in copending application Serial No. 408,945, filed on even date herewith.

While variations may be made in the details thereof, our invention consists of plugs 2 fixed in adjacent ends of sections of the mandrel 1. The plugs 2 may be secured in position by a force fit or by welding, brazing or in any other suitable manner. The plugs 2 are provided with openings 3 extending therethrough, which openings are in register when the sections of the mandrel 1 are in juxtaposed position and in mandrel form. A shaft 4 extends through openings 3. The plugs 2 are constructed for sliding movement upon the shaft or pin 4. The shaft 4 is provided with a way 5 extending longitudinally thereof and provided with offsets 6 at the ends thereof. The plugs 2 are provided with keys 7 constructed to slide in the way 5 of the shaft 4. Keys 7 are secured in position in the plugs 2 by the screws 8 or by any other suitable means. The plugs 2 are provided with oblique faces 9 adapted to cooperate with corresponding faces in the offset 6 of the way.

In mandrels of the type of construction which employ a surface layer of fabric, means are provided for securing the fabric over the edge of the free ends of the mandrel sections. In the present instance this means takes the form of rings 10 constructed to fit into circular slots 11 formed in the plugs 2. The rings 10 are provided with curved faces to cooperate with the adjacent faces of the plugs 2 to secure the fabric 12 in position therebetween. The rings 10 are secured to the plugs in any suitable manner as by the screws 13.

In the operation of the device the sections of the mandrel 1 may be moved together in the position shown in Fig. 1, the keys 7 and way 5 cooperating to maintain the sections in proper alignment. When it is desired to separate the sections of the mandrel, the sections having been released by means not shown, the sections are moved apart until the keys 7 reach the end of the way 5 when the sections of the mandrel 1 may be rotated through a limited arc thereby bringing the keys 7 into the offsets 6 of the way 5, in which position they are held from movement longitudinally with respect to each other. The force exerted by the stretched tube on the mandrel jams the keys 7 into the notches of the offsets 6 so that the sections of the mandrel are held in that position. When the sections are in such separated rotated position the mandrel is most conveniently withdrawn from a rubber tube formed on the surface of the mandrel through an aperture in the tube.

The device may be modified so that the pin is rigid with one of the mandrel sections while the other mandrel section may be mounted on the pin in a manner similar to that herein disclosed.

While the preferred embodiment of the invention has been described by way of illustration, it is not intended so to limit the invention inasmuch as modifications may be made therein without departing from the scope of the invention which is defined in the following claims.

Having thus described our invention, what we claim and desire to protect by Letters Patent is:

1. A joint for a toroidal mandrel having at least two curved sections comprising apertured members in the adjacent ends of two sections, a pin upon which the members are slidable, and means carried by the members and the pin for maintaining the sections in the same plane when juxtaposed and for permitting relative rotation of the sections when separated.

2. A joint for a toroidal mandrel having at least two curved sections comprising apertured members in the adjacent ends of two sections, a pin upon which the members are slidable, a way and followers carried by the pin and the members for maintaining the sections in the same plane when juxtaposed, said way having offsets for permitting relative rotation of the sections when separated.

3. A joint for a toroidal mandrel having at least two curved sections comprising apertured members in the adjacent ends of the sections, a member upon which the members are slidable, said member having means for aligning the sections when in juxtaposition and for maintaining the sections separated when in separated position.

4. A toroidal mandrel comprising a plurality of curved sections and a joint permitting relative angular and translatory movements between a pair of said sections and comprising a pin projecting into the ends of said sections, and connecting means between the pin and sections for permitting relative angular and translatory movements of the sections about and along said pin.

5. A toroidal mandrel comprising a plurality of curved sections and a joint permitting relative angular and translatory movements between a pair of said sections and comprising a pin projecting into the ends of said sections, and a key and slot connection between said pin and at least one of said sections to permit relative translatory movement of said sections along said pin, and said slot having provision for relative angular movement between said sections.

6. A toroidal mandrel comprising a plurality of curved sections and a joint permitting relative angular and translatory movements between a pair of said sections and comprising a pin projecting into the ends of said sections, a key and slot connection between said pin and at least one of said sections to permit relative translatory movement of said sections along said pin, and said slot having an off-set portion near the outer end to permit relative angular movement between the sections.

Signed at Passaic, county of Passaic, State of New Jersey, this 18th day of November, 1929.

PERCY C. DUTTON.

Signed at Passaic, county of Passaic, State of New Jersey, this 18th day of November, 1929.

EARDLEY HAZELL.